United States Patent Office 2,848,743
Patented Aug. 26, 1958

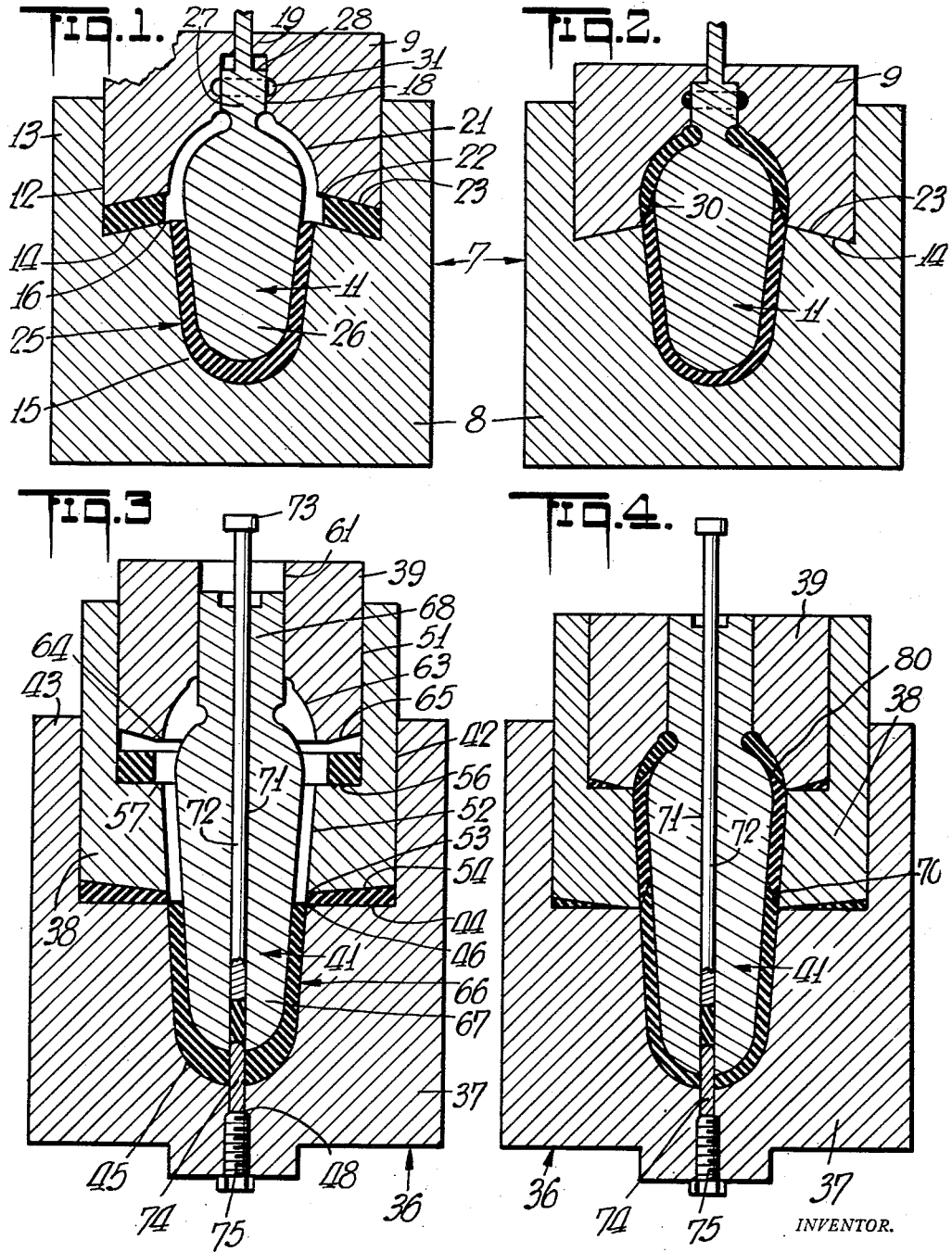

2,848,743
METHOD AND EQUIPMENT FOR FORMING BLADDERS

Jean Mercier, New York, N. Y.

Application November 19, 1953, Serial No. 393,146

10 Claims. (Cl. 18—42)

This invention relates to the art of molding and more particularly to a method and equipment for forming bladders.

Where, during the process of forming an elongated bladder from suitable material such as, for example, natural or synthetic rubber, the length of the bladder requires that a plurality of separate charges of such material be used to form the various portions of the bladder, unless the junction between each of such portions is of considerable length, the bladder may be relatively weak and subject to breakdown at such junctions.

Where the core used to form an elongated bladder is of such length that material displacement is possible of its lower end, unless such lower end can be dependably guided, the wall thickness of the bladder may not be uniform around its entire circumference. Where a rod is used which extends through the bottom of the mold cavity into an axial bore in the core to serve as a guide, unless such guide rod can be removed and a charge of material inserted into the resultant opening in the bottom of the bladder without release of pressure in the mold cavity, the bottom of the bladder will be weakened at the region of such opening.

It is accordingly among the objects of the invention to provide a relatively simple method and correspondingly simple equipment for forming an elongated bladder from a plurality of separate charges of the material from which the bladder is formed, which method and equipment provides an elongated junction between the various portions of the bladder so that the bladder is not subject to breakdown at such junctions.

Another object of the invention is to provide an equipment in which an elongated mold core is dependably guided without likelihood of excessive displacement at its lower end and which ensures that the completed bladder will be devoid of any weak spots at the region adjacent the guide means.

According to the invention these objects are accomplished by the steps and by the arrangement and combination of elements hereinafter described and particularly recited in the claims.

In the accompanying drawings in which are shown one or more of the various possible embodiments of the several features of the invention:

Fig. 1 is a sectional view of one embodiment of the invention at one stage of the molding process, Fig. 2 is a view similar to Fig. 1 of another stage of the molding process, Fig. 3 is a view similar to Fig. 1 of another embodiment of the invention at one stage of the molding process, Fig. 4 is a view similar to Fig. 3 of another stage of the molding process.

Referring now to the drawings, the mold 7 shown in Figs. 1 and 2 comprises a base 8, a plunger 9 and a core 11. The base 8 has a central depression 12 with an upstanding wall 13 rising from the floor 14 and a central recess 15 of desired configuration, illustratively substantially conical, conforming to the desired configuration of the bottom portion of the bladder to be formed, with the mouth 16 of the recess 15 being exposed at the floor 14. As is clearly shown in Figs. 1 and 2, the floor 14 slopes downwardly from the rim of the mouth 16 to the bottom of side wall 13.

The plunger 9 has an outside dimension such that it may readily fit into the central depression 12 and has an axial bore 18 therethrough which may have an inturned flange 19 at its upper end. The inner surface of side wall 13 and the outer wall of the plunger 9 are preferably inclined outwardly at a slight angle to facilitate removal of the plunger after the molding operation has been completed as upon lifting of the plunger the outer wall surface of the plunger will move away from the inner surface of side wall 13 to break any adhesion therebetween due to seepage of the material being molded. The plunger 9 at its bottom has a concave recess 21 conforming to the desired configuration of the top portion of the bladder and which is in communication at its upper end with the lower end of the bore 18 and has its mouth 22 of substantially the same diameter as the mouth 16 of the recess 15. Thus when the plunger is moved downwardly into depression 12 until its bottom 23, which is inclined downwardly at an angle corresponding to that of floor 14 so that it may rest flush thereagainst, engages said floor, the plunger recess 21 and base recess 15 will define the mold cavity 25.

The core 11 comprises a body portion 26 of configuration complementary to that of the cavity defined by the base recess 15 and plunger recess 21 and an axial stem 27 which is designed to extend through the bore 18 and fit snugly yet slidingly therein and is of reduced diameter at its upper end, defining an annular shoulder 28 against which the flange 19 of the plunger may abut.

The wall of bore 18 desirably has an annular groove 31 therein which defines a reservoir to collect excess material from the mold cavity as the bladder is formed.

To form the bladder with the mold shown in Figs. 1 and 2, a predetermined charge of material such as uncured rubber, natural or synthetic, is placed in the bottom of the recess 15 in base 8. A second charge of such material is also placed on the floor 14 of the depression 12 in said base. The core 11 is then placed in the recess 15 and the plunger 9 is positioned in the depression 12 so that the stem 27 of the core extends through the bore 19 of the plunger.

The core 11 is then moved downwardly as by means of a hydraulic press until the uncured rubber rises approximately to the level of the floor 14. Such downward movement of the core is approximately 95 percent of its full stroke. The plunger 9 is then moved downwardly also by means of a hydraulic press and this will force the charge of material on floor 14 into the upper portion of the mold cavity. When the plunger is moved approximately 95 percent of its stroke, the flange 19 will engage the shoulder 28 of the stem 27 and thereupon with continued pressure by means of such hydraulic press on the plunger, both the plunger 9 and core 11 will move downwardly for the remaining 5 percent of their respective strokes until the bottom 23 of the plunger seats against the floor 14.

By reason of such joint movement of the core 11 and the plunger 9, the additional material forced from the floor 14 will rise into the upper portion of the mold cavity at the same time as the additional material forced from the bottom of the cavity rises therein. As there will be less resistance offered to the upward movement of the material from the bottom of the cavity at the region adjacent the core than at the region adjacent the floor 14 by reason of the lateral movement of the material from the floor 14 toward the core, the material adjacent the core will rise at a greater rate than the material adjacent such floor, with the result that a tapered or inclined junction will be provided therebetween, as is clearly shown in Fig. 2 as at 39. The bladder in the mold may then be cured in conventional manner.

The mold 36 shown in Figs. 3 and 4 is designed to fabricate bladders of greater length than can efficiently be made with the mold 7, shown in Figs. 1 and 2, and comprises a base 37, an outer plunger 38, an inner plunger 39 and a core 41.

The base 37 has a central depression 42 with an upstanding wall 43 rising from its floor 44 and a central recess 45 of desired configuration, illustratively substantially conical conforming to the desired configuration of the bladder to be formed, with the mouth 46 of recess 45 being exposed at the floor 44. The base 37 also has a bore 48 at its lower end which leads into the bottom of recess 45 and is centrally located therein. The outer plunger 38 has an outside dimension such that it may readily fit into the central depression 42 and has a bore 51 extending therethrough which is substantially in the form of a truncated cone at its lower portion as at 52 with the lower end 53 of such portion 52 having substantially the same diameter as the mouth 46 of recess 45.

Although the bottom 54 of the plunger may conform to the configuration of the floor 44 of the depression 42, in the illustrative embodiment shown, it desirably is inclined upwardly at a slight angle. The bore 51 of the outer plunger 38 desirably is of enlarged diameter substantially midway between its ends, defining a shoulder 56, the inner periphery of which is aligned with the upper end 57 of the cone portion 52.

The inner plunger 39 has an outside dimension such that it may readily fit into the enlarged diameter portion of bore 51 and has an axial bore 61 therethrough which has a concave recess 63 at its lower end conforming to the desired configuration of the top portion of the bladder, the mouth 64 of said recess being of substantially the same diameter as that of the upper end of the truncated conical portion 52. The undersurface 65 of the inner plunger 39 may be of any desired configuration but preferably is inclined upwardly, as shown.

The adjacent surfaces of wall 43 and plunger 38, and the adjacent surfaces of the bore 51 in plunger 38 and plunger 39 also are preferably inclined outwardly at a slight angle to facilitate removal of the plungers after the molding operation.

When the plungers 38 and 39 are moved downwardly in the manner to be described, to the bottom of their stroke, the base recess 45, the bore 52 in the outer plunger 38 and the recess 63 in the inner plunger 39 will define the mold cavity 66.

The core 41 comprises a body portion 67 of configuration complementary to that of the cavity 66 and an axial stem 68 which is designed to fit snugly yet slidingly in the bore 61 of the inner plunger 38. The core 41 desirably has a longitudinal bore 71 extending therethrough, which when the stem 68 is positioned in the bore 61, will be longitudinally aligned with the bore 48 in the base. A cylindrical rod 72 extends through bore 71 protruding therefrom as at 73 at its upper end. A cylindrical plug 74 is positioned in the upper portion of bore 48 and may extend through the bottom of the recess 45 into the lower end of the bore 71 of the core. The plug 74 is desirably restrained from downward displacement by means of a screw 75 positioned in the correspondingly threaded lower end of bore 48.

To form the bladder with the mold shown in Figs. 3 and 4, a predetermined charge of material such as uncured rubber is placed in the bottom of the recess 45 in the base 37 with the plug 74 extending into such charge of material. A second charge of material is placed on the floor 44 of the base 37 and the outer plunger 38 is then positioned in the central depression 42. The core 41 is then passed through the bore 52 and positioned in the recess 45 after a charge of material has been placed into the lower end of bore 71. A third charge of material is then placed on the shoulder 56 of the outer plunger 38 and the inner plunger 39 is then positioned in the upper portion of the bore 51 of the outer plunger 38 so that the stem 68 of the core will be positioned in and guided by the bore 61 of such plunger. In the event the material from which the bladder is formed is in liquid form, more or less viscous, the charge of material in bore 71 could be sucked therein after the core has been positioned in the recess 45 in the body of material therein, by merely lifting the rod 72.

The core 41 is thereupon moved downwardly as by means of a hydraulic press for approximately 95 percent of its stroke, the upper end of the plug 74 entering the lower end of the bore 71 of the core 41 at such time.

Such downward movement of the core 41 will cause the material in recess 45 to rise to substantially the level of the floor 44. At this time with the core 41 restrained from upward movement, the outer plunger 38 is moved downwardly for substantially 95 percent of its stroke, causing the material on floor 44 to rise in the cavity defined between bore 52 and the adjacent core wall, to substantially the level of the shoulder 56. With both the core 68 and plunger 38 now restrained from upward movement, the inner plunger 39 is moved downwardly also for approximately 95 percent of its stroke so that the material on shoulder 56 will rise to fill the recess 63.

With the upper ends of the inner and outer plungers and the stem of the core now substantially aligned, these three elements are moved downwardly simultaneously, as by means of a hydraulic press, for the remaining 5 percent of their stroke to assume the position shown in Fig. 4. As a result of such movement, as previously described with respect to the embodiment of Fig. 1, additional material will be forced upwardly from the recess 45 to form an elongated junction 70 between the portion of the bladder in the recess 45 and that in the bore 52. Simultaneously an elongated junction 80 will also be formed between the portion of the bladder in bore 52 and that in the recess 63.

By reason of the plug 74, the lower end of the core 41 has been restrained from lateral displacement during the pressing operations above described. After the mold is fully closed, the screw 75 is moved downwardly, the plug 74 being retained in position by means of the pressure exerted thereagainst by the contacting rubber of the bladder wall. The plunger 71 is thereupon moved downwardly by any suitable means to exert pressure on the charge of material in bore 71 which will thereupon force the plug 74 downwardly. The plug and charge of rubber is moved downwardly until such charge fills the space in the lower portion of the bladder previously occupied by such plug.

As a result of such movement of the plug and the rod, the pressure on the material in the mold cavity 66 will be at all times maintained and as the charge in bore 71 enters the space occupied by the plug 74, simultaneously with the movement of the latter out of such space, it will completely fill the latter. The bladder in the mold after the operations above described have been performed, may then be cured in conventional manner.

As the elongated junction provided by the methods and equipments above described provides an excellent contact area which offers extreme resistance to stresses thereagainst, between adjacent portions of the bladder formed from a plurality of separate and distinct charges of material, the possibility of breakdown or tearing of the bladder is greatly minimized.

As many changes could be made in the above methods and equipments, and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention, what I claim as new and desire to secure by Letters Patent of the United States is:

1. The method of molding a bladder which comprises positioning a plurality of charges, each of a predetermined quantity of material from which the bladder is to be formed, at a corresponding plurality of fixed locations longitudinally spaced along the length of a mold cavity, with one of the charges being at the bottom of the mold cavity and the charge most remote from the last named charge being longitudinally spaced from the other end of the mold cavity, placing a core in such cavity, and starting with the charge in the bottom of the cavity, successively applying pressure directly against each of such charges until each charge of material rises in the cavity to substantially the level of the charge of material immediately thereabove and the charge most remote from the charge in the bottom of the cavity rises to the top of the cavity and thereupon simultaneously applying pressure against all of such charges of material to effect further upward movement of the material.

2. The method of molding a bladder which comprises charging the lower end of a mold cavity with a predetermined quantity of material from which the bladder is to be formed sufficient to form at least the bottom portion of the bladder, charging a second predetermined quantity of material into the upper portion of the mold, placing a core in the mold cavity, exerting pressure against such core until the level of the first named charge of material in the mold rises to substantially the level of the second named charge, thereupon exerting pressure against the second named charge of material until it rises to substantially the top of the mold cavity and thereupon simultaneously exerting pressure against both of said charges of material, the pressure against the second charge of material being such as to urge the second charge toward the core into the path of movement of the first charge when pressure is applied thereto.

3. The method of molding a bladder which comprises charging the lower end of a mold cavity with a predetermined quantity of material from which the bladder is to be formed sufficient to form at least the bottom portion of the bladder, charging a plurality of predetermined quantities of material at a corresponding plurality of fixed locations longitudinally spaced along the length of the cavity, each of such charges being at least sufficient to form the corresponding portion of the bladder, placing a core in the mold, successively applying pressure directly against each of such charges until each of such charges of material rises in the cavity to substantially the level of the charge immediately thereabove and the topmost charge rises to the top of the cavity, the charges above the bottommost charge, upon application of pressure thereto, being urged toward the core into the path of movement of the charge immediately therebelow when pressure is applied to the latter, and thereupon simultaneously applying pressure against all of such charges to effect further upward movement of the charges of material.

4. Equipment for molding bladders comprising a base having a recess therein adapted to receive a charge of molding material, material receiving means laterally of said base recess and above the lower end of the latter to receive additional molding material, slidable pressure exerting means adapted to move against the material on said material receiving means, said slidable pressure exerting means having conformations complementary to the base recess to define the mold cavity, and a core in said cavity movable therein to react against the material in said base recess.

5. Equipment for molding bladders comprising a base having a recess therein adapted to receive a charge of molding material, a material receiving portion above said base recess and laterally thereof to receive a second charge of molding material, a plunger adapted to move against the second charge of material, said plunger having a bore therethrough and a recess at its lower end, said base recess and said plunger recess defining the mold cavity, and a core in said cavity movable therein to react against the material in said base recess.

6. The combination set forth in claim 5 in which said core comprises a body portion and a stem, said stem being conformed to fit snugly yet slidingly in the bore of said plunger, said stem being of reduced diameter at its upper end defining a shoulder and said plunger bore has a lateral flange at its upper end adapted to coact with the shoulder on said stem.

7. The combination set forth in claim 6 in which the bore in said plunger has an annular groove therein defining a reservoir.

8. Equipment for molding bladders comprising a base having a central depression therein, a recess in said base adapted to receive a charge of molding material, said recess having its mouth exposed at the floor of said central depression, the portion of said floor laterally of said mouth defining a material receiving portion, to receive a second charge of molding material, a plunger conformed to fit into said central depression, said plunger having a bore therethrough of enlarged diameter at its upper end defining an annular shoulder which forms a second material receiving portion, an additional plunger conformed to fit into the enlarged diameter portion of the bore in said first plunger, said second plunger having a bore therethrough and a recess at its lower end, the diameter of the lower and upper ends of the bore at the lower portion of the first plunger being substantially equal respectively to the diameter of the mouths of the base recess and the second plunger recess, said base recess, the bore at the lower end of the first plunger and the second plunger recess defining the mold cavity, and a core conformed to fit into said cavity and movable therein to react against the material in the base recess.

9. The combination set forth in claim 8 in which said core comprises a body portion and a stem, said stem being conformed to fit snugly yet slidingly in the bore of said second plunger, said base having a bore at its lower end leading into the lower end of the base recess and axially aligned therewith, said core having an axial bore therethrough adapted to be aligned with the bore in said base, a plunger rod in said core bore, a rod in said base bore and means releasably to restrain said base rod from downward movement.

10. A mold comprising a base having a recess therein and a core adapted to fit into said recess and having associated means to retain the mold closed, said base having a bore at its lower end leading into the lower end of the base recess and axially aligned therewith, said core having an axial bore therethrough adapted to be aligned with the bore in said base, a plunger rod in said core bore, a rod in said base bore and means releasably to restrain said base rod from downward movement.

References Cited in the file of this patent

UNITED STATES PATENTS

| | | |
|---|---|---|
| 1,040,737 | Murray | Oct. 8, 1912 |
| 1,811,086 | Kasch | June 23, 1921 |
| 1,877,673 | Law | Sept. 13, 1932 |
| 2,092,410 | Wheeler | Sept. 7, 1937 |
| 2,098,395 | Law | Nov. 9, 1937 |
| 2,363,508 | Doster et al. | Nov. 28, 1944 |
| 2,615,203 | Du Pree | Oct. 28, 1952 |